United States Patent [19]

Lo et al.

[11] 4,120,562

[45] * Oct. 17, 1978

[54] STEREOSCOPIC PICTURE

[75] Inventors: Allen Kwok Wah Lo; Jerry Curtis Nims, both of Dunwoody, Ga.

[73] Assignee: Dimensional Development Corporation, Atlanta, Ga.

[ * ] Notice: The portion of the term of this patent subsequent to Apr. 27, 1993, has been disclaimed.

[21] Appl. No.: 676,385

[22] Filed: Apr. 12, 1976

Related U.S. Application Data

[62] Division of Ser. No. 508,823, Sep. 24, 1974, Pat. No. 3,953,869.

[51] Int. Cl.$^2$ .................... G02B 27/22; G03B 27/32; G03B 35/14
[52] U.S. Cl. ..................................... 350/130; 355/22
[58] Field of Search ............... 350/130, 131, 144, 167; 355/22, 71; 354/112–116

[56] References Cited

U.S. PATENT DOCUMENTS

| | | | |
|---|---|---|---|
| 1,918,705 | 7/1933 | Ives | 350/131 |
| 2,384,578 | 9/1945 | Turner | 355/71 X |
| 3,241,429 | 3/1966 | Rice et al. | 350/167 |
| 3,482,913 | 12/1969 | Glenn | 355/33 |
| 3,508,920 | 4/1970 | Glenn | 96/40 |
| 3,666,465 | 5/1972 | Winnek | 350/131 X |
| 3,678,833 | 7/1972 | Leach | 354/112 |
| 3,978,500 | 8/1976 | Brachet | 354/115 X |

FOREIGN PATENT DOCUMENTS

| | | |
|---|---|---|
| 894,171 | 2/1972 | Canada. |
| 1,113,502 | 12/1955 | France. |
| 1,269,971 | 4/1972 | United Kingdom. |

OTHER PUBLICATIONS

*Stereoscopy,* N. A. Valyus, Focal Press, London, England (1966), pp. 203–205.
*Applied Optics and Optical Engineering,* R. Kingslake, Automatic Press, New York, London (1965), pp. 108–116.

*Primary Examiner*—John Gonzales
*Attorney, Agent, or Firm*—Brumbaugh, Graves, Donohue & Raymond

[57] ABSTRACT

An autostereoscopic picture is produced by taking a series of two-dimensional views of an object field and projecting them in an enlarger onto lenticular print film. Substantially uninterrupted and non-overlapping lineiform image bands of high image quality are formed on all areas of the lenticular film by scanning the projected images from each two-dimensional view over a predetermined distance along the photosensitive surface. A novel image structure of improved quality is thereby produced.

1 Claim, 6 Drawing Figures

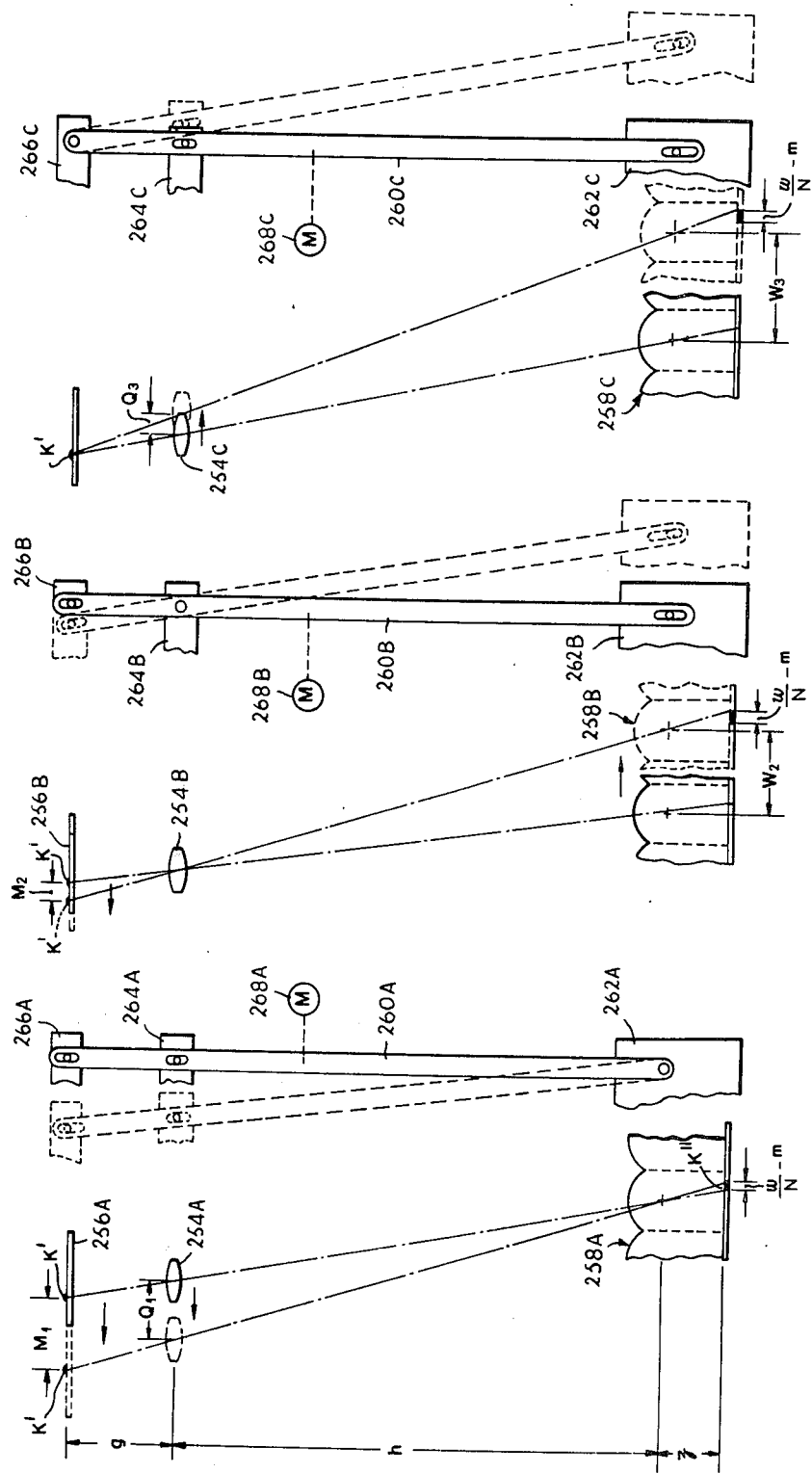

STEREOSCOPIC PICTURE

BACKGROUND OF THE INVENTION

CROSS REFERENCE TO RELATION APPLICATION

The present application is a divisional of copending U.S. application Ser. No. 508,823, filed Sept. 24, 1974, for "Stereoscopic Photography Methods and Apparatus" and now U.S. Pat. No. 3,953,869.

FIELD OF THE INVENTION

The present invention relates generally to the production of autostereoscopic pictures of the type employing lenticular screens and, more specifically, to a novel image structure in such pictures which affords a stereoscopic view of improved quality.

THE PRIOR ART

Lenticular screen-type autostereoscopic pictures are produced basically in two ways, the direct or "in camera" technique, in which the taking and composing steps are both carried out within the camera, and the indirect technique, in which a number of two-dimensional views of an object field are made from different vantage points and the three-dimensional picture is subsequently composed by projecting the two-dimensional images through a composing lenticular screen. As practiced in the prior art, however, both techniques have been subject to use, quality and/or cost limitations which have all but precluded their widespread commercial application.

For example, the direct technique typically requires a specifically constructed camera, embodying a lenticular screen sheet located on the emulsion side of the photographic film, and an associated tracking mechanism which constrains movement of the camera to an arcuate path centered around a point in the scene to be photographed. During exposure, the camera is moved along the arcuate path defined by the tracking mechanism and the lenticular screen is shifted relative to the photographic film by a total distance equal to one lenticule width. This requires precision movements of the various camera and tracking components, with attendant complexity of operation and construction. The apparatus moreover is quite bulky, which limits its usefulness for location photography. The direct process also necessitates exposure times of comparatively long duration, a rather severe limitation, and has the further disadvantage of lacking good depth of field. An additional drawback is that the final three-dimensional picture cannot be freely enlarged or reduced in size.

The indirect technique, by allowing the use of a conventional two-dimensional camera in photographing the object field or scene, eliminates most of the aforementioned drawbacks of the direct technique. Furthermore, recent developments by Lo and Nims relating to the manner of making the two-dimensional exposures, as described in copending, commonly-owned U.S. application Ser. No. 508,810 for "Methods and Apparatus for Taking and Composing Stereoscopic Pictures," filed Sept. 24, 1974, now U.S. Pat. No. 3,960,563 have significantly advanced the state of the art of the indirect technique. Limitations in the composing step have nevertheless continued to impede general usage of the indirect process. This has been due chiefly to the need to produce the final image-bearing sheet (composed of interdigitated lineiform images from the several two-dimensional views) separately from the viewing screen and thereafter to laminate it to the screen with the lineiform images and screen lenticules in precise alignment. Since the image-bearing sheets frequently change size between composing and laminating, as a result for example of fluctuations in ambient temperature, humidity, etc., such alignment of the image sheet and the viewing screen is quite laborious and costly and often cannot be satisfactorily attained. Efforts to apply mass production techniques to the alignment step, by means of litho or offset printing of the image sheet and forming the lenticular screen directly on the image sheet for instance, not only do not adequately eliminate alignment problems but create still other difficulties, such as poor color reproduction, further change of dimension of the image sheet, low density of printing inks, low resolution of the printed image and the like, which further impair the picture quality.

Attempts have been made to overcome the laminating and alignment problems of the indirect composing step by coating a photographic emulsion directly on the rear surface of a lenticular screen and using the "lenticular film" thus produced in composing the final three-dimensional picture from the projected two-dimensional images; that is to say, the lenticular film is used in place of the separate composing lenticular screen and photosensitive sheet. The two-dimensional views are projected sequentially or simultaneously through the lenticular screen to expose the photosensitive emulsion beneath the lenticules. A rudimentary composing system of this nature is described by N. A. Valyus at pages 203–205 of "Stereoscopy," the Focal Press, London W.1, England (1966); see also U.S. Pat. No. 3,482,913, granted Dec. 9, 1969, to W. E. Glenn, Jr. Although avoiding laminating and alignment problems, the prior art indirect composing procedures employing lenticular print film have failed to overcome other problem areas in the composing step. For example, autostereoscopic pictures thus produced have heretofore had limited viewing angles and distances owing to the necessity of viewing the lenticular screen from the same distance and position that the two-dimensional frames were projected during composing. This seriously detracts from the quality of the final picture. It is necessary with known print film composing systems and processes, moreover, to make individual adjustments of the composing system components, such as the distance between enlarging lenses, the projection distance, etc., in order to obtain acceptable sharpness in the three-dimensional picture. Often this is not properly done, with resultant loss of picture quality, and in any event is a costly, time consuming operation. Such adjustments are required, for instance, every time the distance between the camera and the center of interest of the object field, i.e., the element or point to appear in the plane of the three-dimensional picture, is changed. As is developed in detail hereinafter, this necessity compels a substantial number of interrelated adjustments. Heretofore the prior art has neither comprehended the full nature of these adjustments nor provided an effective way of avoiding them or of implementing them in a simplified and reliable manner. The end result has been that the prior art has failed to provide indirect composing apparatus and procedures which are capable of producing high quality autostereoscopic pictures with efficiency and cost factors permissive of widespread commercial application of the technique.

The foregoing and other requirements of the prior art are fulfilled by the present invention.

SUMMARY OF THE INVENTION

In accordance with the invention, the relationships between the taking and composing steps required to produce high quality stereoscopic pictures by use of the indirect technique are established and novel and advantageous forms of apparatus embodying these relationships are provided. The result is an overall integrated system wherein the various components of the taking step and the composing step, i.e., the camera, the enlarger, and the lenticular screen, are so constructed and arranged, both individually and in relation to one another, as to afford marked advantages relative to prior art systems in respect of picture quality and economy.

According to the invention, the composing apparatus includes structure for changing the angle of projection of each two-dimensional view by a predetermined amount during the projection thereof. This provision allows the area behind each lenticule to be completely filled with condensed images of the object field without at the same time requiring an extremely large number of two-dimensional views. The projecting lens locations preferably are equidistantly separated by a distance such that N condensed images behind each lenticule of the lenticular screen will be spaced apart by substantially w/N. The angle of projection of each two-dimentionsal view would in this instance be changed by an amount sufficient to expand the width of the individual condensed images to substantially w/N. Each lenticule would thus be filled with N condensed images, each corresponding to an element of each two-dimensional view and each substantially w/N in width. The N two-dimensional views may be projected sequentially or simultaneously. If simultaneously, the changing of the angle of projection of all views is likewise carried out simultaneously.

As a result of the foregoing composing technique, stereoscopic pictures are produced on lenticular print film which embody a novel image structure of improved quality. Specifically, each of the N condensed images formed behind a lenticule consists across the width w/N thereof of an in-focus image of the subject matter of the element or portion of the corresponding two-dimensional view projected through that lenticule. The N condensed image may be formed by intermittent or continuous changing of the angle of projection. If intermittent, at least each portion of width m of each N condensed image contains the complete image content of the portion of the corresponding two-dimensional view. If continuous, each portion of the condensed image of a width capable of being perceived through the aligned lenticule contains such complete image content. In either event, the image density is substantially uniform over the width w/N of each condensed image.

BRIEF DESCRIPTION OF THE DRAWINGS

For a better understanding of the invention, reference may be made to the following detailed description taken in conjunction with the figures of the accompanying drawing, in which:

FIGS. 4A, 4B and 4C illustrate three forms of apparatus for scanning the projected images from the two-dimensional film frames along the photosensitive surface of the lenticular film.

DETAILED DESCRIPTION

Basic Indirect Process

Figure 1:
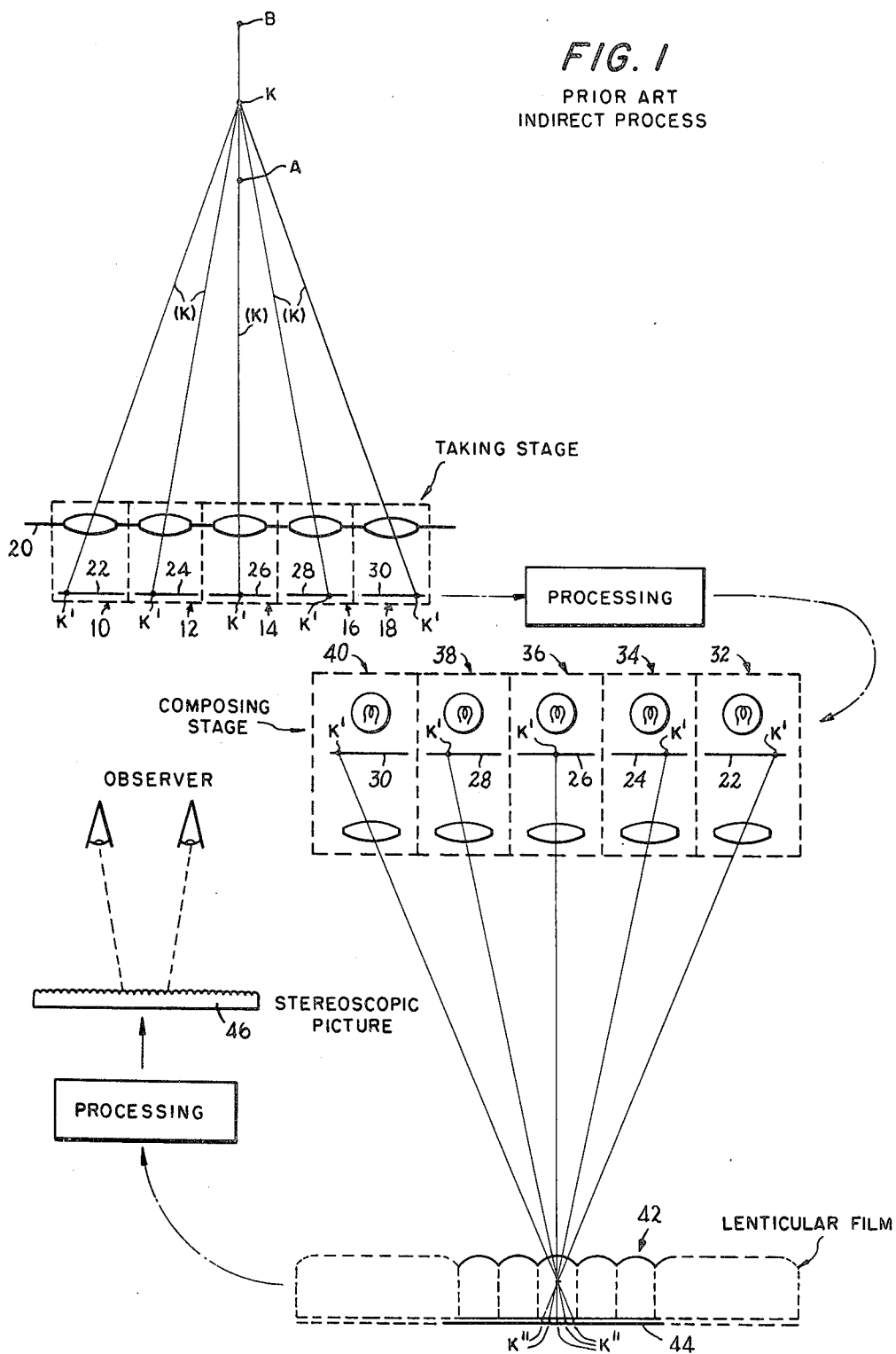
FIG. 1 is a diagrammatic view of the overall indirect process for the production of stereoscopic pictures as practiced in the prior art.

As alluded to above, the indirect process as practiced in the prior art includes basically two distinct steps, a photographing or taking step and a composing step. These steps are illustrated diagrammatically in FIG. 1 in the context of the overall indirect process. In the taking step, a series of two-dimensional views of an object field, including, for example, the elements A, K and B (shown for simplicity in a straight line) are taken from a corresponding number of photographic vantage points aligned transversely of the object field. The different photographic vantage points may be established by arranging a number of equidistantly spaced cameras of substantially identical optical characteristics along a path perpendicular to the optical axes of the cameras. Alternatively, a single camera may be moved from vantage point to vantage point relative to the object field (or the object field moved relative to a stationary camera), or a single camera having a number of objectives may be used. An illustrative camera arrangement, therefore, might take the form illustrated in FIG. 1, with five individual cameras 10, 12, 14, 16 and 18 positioned along a straight path 20 and centered relative to the object field elements A, K and B. Upon exposure, the cameras 10–18 produce on the corresponding film frames 22, 24, 26, 28 and 30, respectively, latent images of the object field elements A, K and B. For clarity, only the images K' produced by the central light rays (K) are depicted in FIG. 1. The frames 22–30 are then suitably processed (developed, trimmed, etc.) for use in the composing step.

The processed frames (negatives or positives) 22–30, bearing the developed images K', are placed in a corresponding number of projectors 32, 34, 36, 38 and 40 which are independently adjustable for control of magnification and for alignment of corresponding images of a selected object field element from the several negatives. The particular images selected for registration during composing will determine the object field element that will appear to lie in the plane of the stereoscopic picture. Assuming in FIG. 1 that this is to be the element K, the projectors 32–40 are shifted relative to one another until the projected K' images are aligned with a common point on the lenticular print film 42. Any necessary adjustment to establish commonality of magnification among the projectors 32–40 is also carried out. Thereafter, the projectors are turned on and lineiform images K" corresponding to the K' images from the frames 32–40 are formed on the photosensitive layer 44 of the lenticular film 42 in the well known manner. By virtue of the prior alignment of the projected K' images, all of the K" lineiform images will be formed beneath the same lenticule of the film 42, and indeed such registry of the projected K' images is necessary if sharp stereoscopic pictures are to be obtained.

Finally, the exposed lenticular film is suitably processed to provide the final stereoscopic picture 46 which, upon viewing, affords to the observer an overall view of the object field in relief.

Although, as previously noted, the foregoing indirect process obviates certain of the difficulties encountered with still earlier stereoscopic procedures, it has heretofore not been susceptible of widespread commercial use, owing largely to cost and quality limitations arising from the composing step. The nature and extent of these limitations may be appreciated from an analysis of the photographic and optical parameters of the indirect process.

Overall Indirect System

Figure 2:
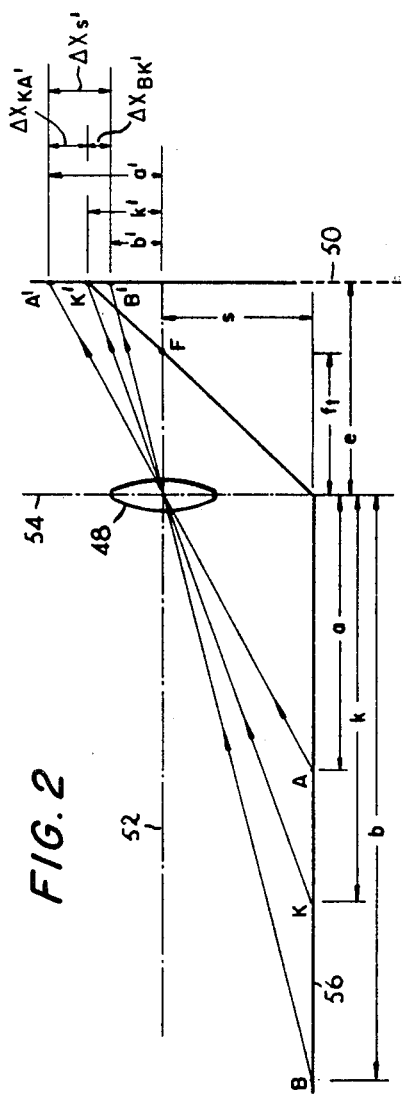
FIG. 2 illustrates certain basic relationships between the elements of a photographic scene and the images of those elements formed by a photographic lens.

By reference to FIG. 2, wherein a single taking lens or camera location (vantage point) is represented by the lens 48, certain basic relationships of the taking step can be established. As before, the object field elements to be photographed are designated A, K and B and the images of those elements formed by the lens 48 on the film plane 50 are designated A', K' and B', respectively. The thin lens 48 is representative of the composite objective lens system of an actual camera, having an optical axis 52. The line 54 indicates the path of alignment of the taking lenses or of movement of the camera relative to the object field, as drawn through the optical center of the lens system. For convenience, it is also assumed that the objects A, K and B are arranged in a straight line 56 parallel to and spaced a distance $s$ from the optical axis 52 of the lens 48 and that element K constitutes the "key subject matter" of the field, i.e., the element of the field whose image is to appear in the plane of the final stereoscopic picture, and hence the element on which the camera is focused. Element A will thus appear to be in the foreground of the final picture and element B in the background.

By simple trigonometric relations, it may be seen that:

$$e = \frac{kf_t}{k - f_t} \quad (1)$$

$$k' = \frac{se}{k} = \frac{sf_t}{k - f_t} \quad (2)$$

$$a' = \frac{se}{a} = \frac{k}{a} k' \quad (3)$$

$$b' = \frac{se}{b} = \frac{k}{b} k' \quad (4)$$

where:

$e$ is the distance from the objective plane to the film plane;

$f_t$ is the focal length of the taking lens;

$a$, $k$ and $b$ are the distances from the objective plane to the object field elements A, K and B, respectively; and $a'$, $k'$ and $b'$ are the distances along the film plane 50 from the lens axis 52 to the images A', K' and B', respectively.

Equations (1)–(4) are applicable to all photographic vantage points, i.e., to all taking lens or camera positions.

The characters $\Delta X_{KA}$, and $\Delta X_{BK}$, in FIG. 2 represent the changes over the distance $s$ in parallax, or parallax values, along the film plane 50 between the key subject matter element image K' and the foreground element image A', on the one hand, and between the key subject matter element image K' and the background element image B', on the other. $\Delta X_s$, is the total parallax value change over the distance $s$. As is explained fully in the aforementioned U.S. application Ser. No. 508,810, now U.S. Pat. No. 3,960,563, and as referred to further hereinafter, the values of $\Delta X_s$, $\Delta X_{KA}$, and $\Delta X_{BK}$, are controlled within limits, with $\Delta X_{KA}$, and $\Delta X_{BK}$, preferably made equal for optimum clarity and relief effect in the stereoscopic picture.

Having established the foregoing taking-step relationships, it is important to ascertain the interdependence of the taking and composing steps. These further relationships may be determined from FIG. 3, wherein, for clarity, the separate taking and composing steps are diagrammatically combined. The order of the two-dimensional views in the composing step of FIG. 3 is thus the reverse of what it actually would be in practice.

Figure 3:
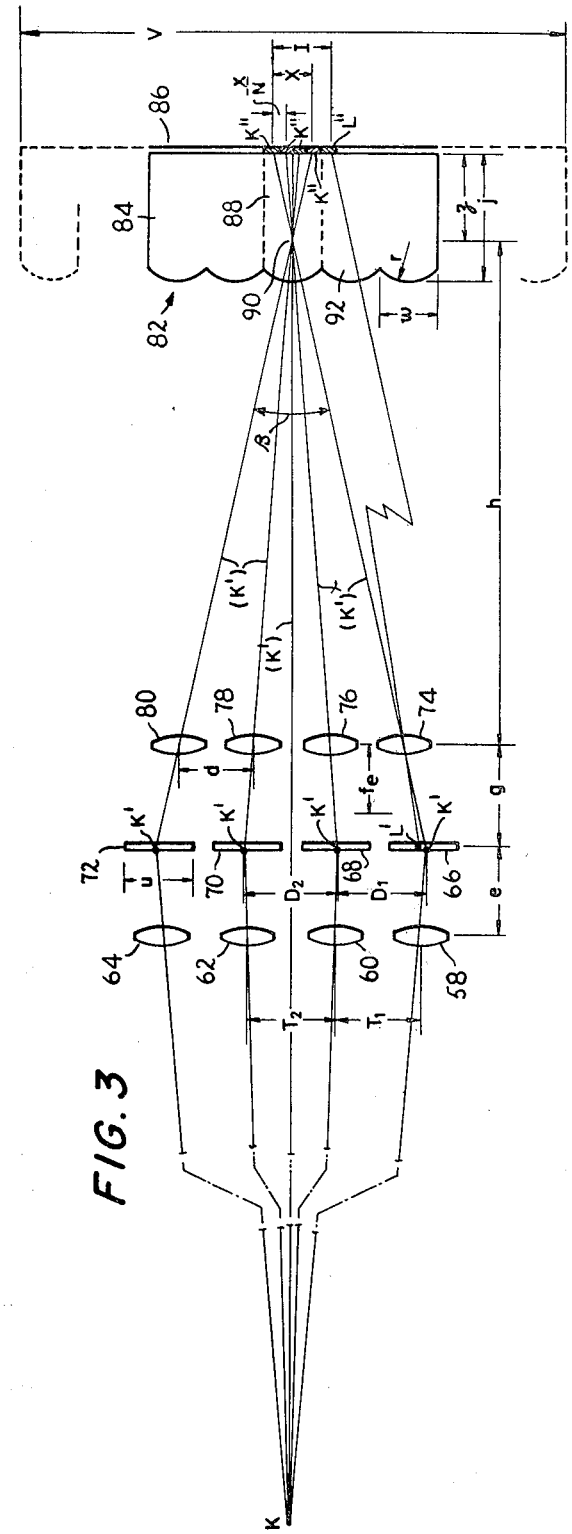
FIG. 3 is a diagrammatic representation showing the relationships between the taking and composing steps of the indirect process.

In FIG. 3, the taking step illustratively embodies four objectives 58, 60, 62 and 64 and four corresponding film frames 66, 68, 70 and 72. Again, to avoid undue complexity, only the key subject matter element K of the object field is shown. Upon exposure, the lenses 58–64 form latent images K', together of course with images (not shown) of all other object field elements within the fields of view of the lenses, on the respective frames 66–72.

The composing step, then, includes a like number of enlarging (projecting) lenses 74, 76, 78 and 80 for projecting the K' images, etc., onto the surface of a lenticular print film 82. The lenticular film 82 is composed of the usual planoconvex lenticular screen 84 having coated on its base (the focal plane of the screen) a photosensitive emulsion layer 86. The composing screen and photosensitive layer could be separate if desired, or they could be formed separately and bonded or otherwise affixed together prior to exposure. As is well known, the lenticular screen 84 condenses the projected K' images from the respective frames 66–72 into a corresponding plurality of lineiform images K'' on the photosensitive layer 86 which, when the frames and enlarging lenses are properly arranged, will be substantially equidistantly spaced beneath a single lenticule 88 of the screen 84. Upon viewing the developed lenticular film 82 through the screen 84, therefore, an observer will see a different lineiform image K'' with each eye, each of which K'' images will depict the key subject matter element K from a different photographic vantage point. If all of the K' images from the frames 66–72 are projected in registry with a common reference point, the central projected rays (K') will pass through the center of curvature 90 of the same lenticule 88. The key subject matter element K will then appear to lie in the plane of the stereoscopic picture. Images of elements in the foreground and background of the object field, however, will not be projected in registry and will therefore be recorded beneath different lenticules of the screen 84. Hence, the observer will perceive those objects as being either in front of or behind the key subject matter element, as the case may be, and consequently will appear to see the overall image of the object field in dimension.

FIG. 3 of course depicts the positional relationships between the key subject matter element K, the taking lenses 58–64, film frames 66–72, the enlarging lenses 74–80, and the lenticular film 82 when all of those components are properly arranged to form on the photosensitive layer 86 all of the key subject matter element images K'' beneath the same lenticule 88 and spaced across substantially the full width of and symmetrically within the lenticule. If this arrangement is not substantially achieved, loss of quality in the final picture, e.g., blurred images, limited viewing angle, unsatisfactory three-dimensional effect, etc., results. But the precise arrangement of object field elements, taking components and composing components portrayed in FIG. 3 rarely exists in practice, necessitating the aforementioned complicated and laborious adjustments during the composing step. Moreover, the prior art has not fully comprehended the nature and interdependency of the adjustments which must be made. In accordance with the present invention, the relationships (derived below) existing between the various components when properly arranged (as in FIG. 3) are utilized to provide improved taking and composing techniques and apparatus which overcome the limitations of the prior art and which provide a novel image structure on lenticular print film productive of high quality stereoscopic pictures.

Returning to FIG. 3 and considering for convenience only the lenses 58, 60 and 62, the center-to-center spacing between lenses 58 and 60 is designated $T_1$, the center-to-center spacing between lenses 60 and 62 is designated $T_2$, and the spacings between the corresponding K' images on frames 66, 68 and 70 are designated $D_1$ and $D_2$, respectively.

By trigonometric relations it may be demonstrated that:

$$D_1 = T_1 \frac{k+e}{k}, \text{ and} \tag{5}$$

$$D_2 = T_2 \frac{k+e}{k} \tag{6}$$

Where the lenses 58, 60 and 62 are equidistantly spaced, $T_1$ equals $T_2$ and $D_1$ equals $D_2$. Hence, the spacing between the K' images on adjacent frames is equal among all of the frames 66–72 when the taking lenses 58–64 are equidistantly spaced. This relationship exists as to the images of all object field elements in the same plane as the element K, i.e., all such co-planar images will be spaced apart by the same distance $D_{K'}$. Accordingly, a general expression for the distance between the images on adjacent frames of corresponding object field elements co-planar with the element on which the taking lenses are focused, where the taking lenses are equidistantly spaced apart by the distance T, may be derived from equations (1) and (5) or (6) as:

$$D_{K'} = T \frac{k+e}{k} = T \frac{k}{k - f_t} \tag{7}$$

Similarly, the spacings between the adjacent images of any foreground object element, e.g., element A in FIG. 1, or any background object element, e.g., element B in FIG. 1, and of any other object field elements in the same planes, can be expressed as:

$$D_{A'} = T + T \left[ \frac{f_t}{k - f_t} \right]^{\frac{k}{a}} \tag{8}$$

$$D_{B'} = T + T \left[ \frac{f_t}{k - f_t} \right]^{\frac{k}{b}} \tag{9}$$

Turning briefly to the lenticular film 82, the pertinent parameters of the lenticules, according to well known lenticular lens theory, are as follows:

$$z = \frac{j}{n} \tag{10}$$

$$r = j(1 - \frac{1}{n}) \tag{11}$$

$$P = \frac{1}{w} \tag{12}$$

$$\theta = 2\arctan \frac{nw}{2j} \tag{13}$$

where:
 $j$ is the thickness of the lenticules;
 $n$ is the index of refraction of the screen material;
 $r$ is the radius of curvature of the individual lenticules;
 $P$ is the number of lenticules or lines per inch;
 $\theta$ is the viewing angle of the lenticules;
 $z$ is the distance between the center of curvature of the lenticules and the focal plane of the screen; and
 $w$ is the width of an individual lenticule.

Considering now the composing step, it can be established that the distance $g$ between the plane of the enlarging lenses 74–80 and the plane of the frames 66–72, the distance $h$ between the enlarging lens plane and the lenticular film 82 (actually the plane of the centers of curvature of the lenticules), the center-to-center spacing $d$ between adjacent enlarging lenses, the focal length $f_e$ of the enlarging lenses, the size $u$ of the useful image area of one of the frames in a direction perpendicular to the lengthwise extent of the lenticules of the film 82, and the corresponding size $v$ of the final stereoscopic picture, are related as follows:

$$\frac{h+z}{g} = \frac{v}{u} \tag{14}$$

Typically, $h$ will be very much greater than $z$, so that in effect $$h/g = v/u \tag{15}$$

Equation (15) gives the magnification factor or enlargement ratio, hereinafter termed R, of the enlarging system.

Moreover, $g$ and $h$ are also constrained with $f_e$ in accordance with:

$$\frac{1}{g} + \frac{1}{h} = \frac{1}{f_e}, \text{ or}$$

$$g = \frac{hf_e}{h - f_e} \tag{16}$$

Hence, by combining equations (15) and (16), $h$ may be expressed in terms of the focal length $f_e$ of the enlarging lenses and the enlargement ratio R:

$$h = f_e(R + 1) \tag{17}$$

For the combined taking-composing condition of FIG. 3, i.e., where the taking lenses 58–64, the frames 66–72 and the enlarging lenses 74–80 are all arranged so as to register each of the K' images with a common reference point, the respective spacings $d$ and D of the enlarging lenses and K' images are related according to:

$$d = \frac{Dh}{g + h} \quad (18)$$

Incorporating equations (7) and (18):

$$d = T\frac{1 + e/K}{1 + g/h} \quad (19)$$

It is apparent from equation (19) that even where $e$ of the camera and $g$ and $h$ of the enlarging system are held constant, the required spacing $d$ of the enlarging lenses will still vary with the photographic distance $k$ to the key subject matter element K and the spacing T of the taking lenses. In normal photographic usage, $k$ is of course almost infinitely variable. For widespread application of the indirect technique, therefore, appropriate provision must be made to take this factor into account in a rapid yet reliable and economic manner. Methods and apparatus useful in achieving this object are described and illustrated in the aforementioned parent application Ser. No. 508,823 now U.S. Pat. No. 3,953,869.

It may further be demonstrated from consideration of FIG. 3 that the optimum lenticule width $w$ of the lenticular screen 84 also varies as a function of the enlarging lens spacing $d$ and hence of the photographic distance $k$. Desirably, when a stereoscopic picture is viewed through the viewing screen there should be no discontinuities or interruptions in the overall image of the object field (resulting, for example, from gaps between adjacent lineiform images or from overlapping lineiform images) presented to the observer regardless of the position from which he views the picture. That is to say, the images of corresponding elements from the respective two-dimensional frames condensed beneath each lenticule should just fill up the area beneath the lenticule without overlapping. The relationships productive of this image arrangement may be seen by reference to FIG. 3 and by consideration of the lineiform images of the key subject matter element K and of other elements in the same plane as the element K.

In FIG. 3, the distance spanned by the images K" beneath the lenticule 88 is given by $$x = zd\frac{N - 1}{h} \quad (20)$$

where:

N is the number of two-dimensional frames.

Then, let L' represent the element image on the frames (shown only on frame 66 in FIG. 3 for clarity) which is focused through the lenticule 92 next to lenticule 88 so as to form thereunder the lineiform image L". The spacing I between the K" image and the L" image from the same frame, e.g., frame 66, is given by:

$$I = w(1 + \frac{z}{h}) \quad (21)$$

To avoid image discontinuities and overlapping in the composed stereoscopic picture, each lineiform image on the photosensitive surface 86 ideally will occupy a distance $x/(N-1)$. The preferred value of I would thus be:

$$I = N\frac{x}{N - 1} \quad (22)$$

The optimum lenticule width $w$ is then that $w$ which satisfies equation (22). This can be had by combining equations (20), (21) and (22):

$$w(1 + \frac{z}{h}) = Ndz/h$$

and, since $h$ is much greater than $z$, for practical purposes:

$$w = Ndz/h = Ndj/nh \quad (23)$$

It may be appreciated that if $w$ is selected according to equation (23), the entire area of the lenticular film will be filled with lineiform image elements which are contiguous but which do not overlap, and that a continuous uninterrupted view of the object field will thus be presented to the observer. However, it follows from equations (23) and (19) that the optimum value of $w$ varies with $d$, and thus with $k$, so that it is not only necessary to account for the change in $d$ occasioned by change in $k$, but to account as well for the accompanying change in the required value of $w$. Otherwise, the lineiform images K", etc., will not be properly placed to provide the desired uninterrupted picture configuration.

Although for purposes of illustration the individual K" and L" lineiform images are shown in FIG. 3 as fully covering the distance I/N (i.e., $w/N$), these images are in fact well focused and consensed by the enlarging lenses and the lenticular screen. In the usual case, they are in reality very narrow line ("lineiform") images of considerably less width than that depicted in FIG. 3. To avoid discontinuities between lineiform images, therefore, it is desirable to expand or scan the individual lineiform images over the distance $(x/N-1) - m$, where $m$ is the width of each unexpanded lineiform image. As one feature of the invention, methods and apparatus are provided for this purpose, as is described hereinafter. Also, it is possible to select the parameters of the lenticular screen and to arrange the enlarging system such that stereoscopic pictures of acceptable quality are provided without expansion of the individual lineiform images. Generally, therefore, the invention affords improved apparatus and methods for implementing the indirect process whether or not image expansion is utilized in the composing stage, although for maximum advantage it preferably is. As another feature of the invention, the novel image structure on the lenticular print film resulting from the scanning technique affords stereoscopic pictures of unusually high quality.

In order to present a noninterrupted stereoscopic picture to the observer, the area beneath each lenticule of the viewing lenticular screen should be completely filled with lineiform images of the object field. For high quality, it is likewise desirable that adjacent lineiform images do not overlap appreciably and that all of the images be of substantially uniform density.

To minimize variation among the lineiform images because of projection of the two-dimensional views through different area of the enlarging lenses, light transmission filters are preferably utilized in conjunction with the enlarging lenses. Suitably, the filters have light transmission characteristics which are the converse of those of the enlarging lenses. Thus, whereas the intensity of light transmitted by a typical lens characteristically falls off with distance from its optical axis, the filters would have increasing light transmission efficiency with distance from their centers. The filters would therefore coact with the lenses to provide lineiform images of substantially uniform density. It may also be desirable, particularly where short focal length lenses are used, to employ taking or enlarging lenses of different focal lengths at the lens locations spaced from the central axis of the camera or enlarger to reduce distortion which otherwise might occur at the edges of the stereoscopic picture due to lack of focus.

Turning now to scanning of the lineiform images and referring to FIG. 3, it has previously been mentioned that the area beneath each lenticule to be occupied by the condensed image from each two-dimensional frame is approximately $x/(N-1)$ in width. In accordance with the invention, this area is filled by scanning the projected image from each frame through the distance $[x/(N-1)] - m$ during projection of the image. In other words, the angle of incidence of the projected rays upon the lenticular screen is progressively changed during projection so as to traverse, or scan, the condensed image formed by each lenticule over the distance $[x/(N-1)] - m$. This is done, moreover, in a way which maintains registry of the projected key subject matter image K' with the reference point. If a multi-lens enlarger is used, conveniently scanning of the projected images from all of the frames is carried out simultaneously, so that the stereoscopic picture may be composed in a single step. With the single lens enlarger system described in parent application Ser. No. 508,823, now U.S. Pat. No. 3,953,869 the images from the separate frames are of course scanned separately.

Scanning may be accomplished in three ways: (1) shifting the two-dimensional film frame or frames and the enlarging lens or lenses while holding the lenticular film stationary, (2) shifting the frame or frames and the lenticular film while holding the enlarging lens or lenses stationary, or (3) shifting the enlarging lens or lenses and the lenticular film while keeping the film frame or frames stationary. All three are equivalent and result in the desired relative movement between projected images from the two-dimensional views and the photosensitive surface of the lenticular film. Accordingly, when the lenticular width $w$ is properly selected and there are N frames, the total distance occupied by the expanded lineiform images, or image bands, beneath each lenticule will just fill up the lenticule.

The three basic ways of scanning are illustrated in FIGS. 4A, 4B and 4C. Only one film frame and its associated enlarging lens are depicted in each instance, but it will be understood that in the case of a multi-lens enlarger the scanning relationships developed hereinafter apply to all frames and lenses.

Considering first FIG. 4A, it will be seen that if the condensed image K'' is to be scanned over the distance $[x/(N-1)] - m$, the enlarging lens 254A must move a distance $Q_1$ and the film frame 256A must move a distance $M_1$, both in the opposite direction (to the left in FIG. 4A) from that in which the image K'' is to be expanded. By trigonometric relations and by reference to equations (18) and (20)–(23), it can be demonstrated that:

$$M_1 = D - m\left[\frac{g+h}{z}\right] \simeq D \qquad (24)$$

and that:

$$Q_1 = d - m\frac{h}{z} \simeq d \qquad (25)$$

The shifting of the lens 254A and the film frame 256A through the distances $Q_1$ and $M_1$, respectively, may conveniently be implemented by means of an arm 260A pivoted to the lenticular film easel 262A in the plane of the centers of curvature of the lenticules and slidably coupled at its other end to the enlarging lens carrier 264A and the film frame carrier 266A. A stepping motor 268A suitably coupled to the arm 260A may be used to pivot the arm.

In the second form of scanning, depicted in FIG. 4B, the enlarging lens 254B remains stationary while the film frame 256A is moved in one direction (to the left in FIG. 4B) by the distance $M_2$ and the lenticular film 258B is moved in the opposite direction (to the right in FIG. 4B) through the distance $W_2$. By trigonometric relations, it may be seen that:

$$W_2 = Q_1 = d - m\frac{h}{z} \simeq d \qquad (26)$$

and that $$M_2 = g\left[\frac{d}{h} - \frac{m}{z}\right] \simeq g\frac{d}{h} \qquad (27)$$

The required shifting of the film frame 256B and the lenticular film 258B may readily be accomplished by a common arm 260B pivoted to the lens carrier 264B and slidably coupled at its opposite ends to the lenticular film easel 262B and the film strip carrier 266B. As before, a stepping motor 268B may be used to operate the arm 260B.

According to the third basic scanning technique, illustrated in FIG. 4C, the enlarging lens 254C is shifted by a distance $Q_3$ and the lenticular film 258C shifted by a distance $W_3$, both in the same direction (for example, to the right as seen in FIG. 4C). In this case, it may be shown that the lens shifting distance $Q_3$ is given by:

$$Q_3 = g\left[\frac{d}{h} - \frac{m}{z}\right] \simeq g\frac{d}{h} \qquad (28)$$

and that the lenticular film shifting distance $W_3$ is equal to:

$$W_3 = D - m\left[\frac{g+h}{z}\right] \simeq D \qquad (29)$$

Here again, shifting of the enlarging lens or lenses and the lenticular film may be effected by use of a single arm 260C, the arm in this instance being pivoted to the film frame carrier 266C and slidably coupled at appropriate points along its length to the enlarging lens carrier 264C and the lenticular film easel 262C. A stepping motor 268C may conveniently be used to actuate the arm.

Scanning of the individual lineiform images through the distance $[x/(N-1)] - m$ along the photosensitive surface may be carried out continuously or intermittently. Continuous scanning has the advantage of speed, thus reducing composing time, and also provides a smoother substantially continuous image over the scanned area. As will be appreciated, scanning of the lineiform images in any one of the foregoing three ways will produce beneath each lenticule a number of condensed images corresponding in number to the number of two-dimensional frames projected, each of which condensed images will occupy substantially $w/N$ of the area beneath the lenticule. Upon completion of scanning, the projection angle $\beta$ (see FIG. 3) of the enlarging system will be substantially equal to the viewing angle $\theta$ of the lenticular screen. The projection angle $\beta$ is the angle subtended by the endmost projection lens locations. The entire lenticule will therefore be completely filled with images. Moreover, since each condensed image is formed by traversing the projected image over the photosensitive surface, there is substantially no variation in density or of sharpness of focus of the image across the extent of the image. This, coupled with the fact that each condensed image depicts over its width only an image of the same element of a single two-dimensional view, affords a stereoscopic picture of high viewing quality. The quality of the image bands, and hence of the final picture, may be even further enhanced by also using the aforementioned light transmission filters and, where appropriate, taking or composing lenses of different focal lengths.

It will be apparent, therefore, that where scanning is fully intermittent, i.e., where one lineiform image of width $m$ at a time is laid down until the width $w/N$ is filled, each portion of width $m$ of each condensed image will contain the full image content of the portion of the two-dimensional view projected onto the overlying lenticule (see FIG. 3). Where scanning is fully continuous, on the other hand, all portions of each condensed image will be exposed to such projected portion of the two-dimensional view and will therefore contain the full image content of such portion. Hence, any portion of the condensed image capable of being perceived through the aligned lenticule by an observer, even though narrower than $m$ in width, will contain and present to the observer the complete image content of that portion of the two-dimensional view projected onto the lenticule during the composing step.

Although the invention has been described and illustrated with respect to specific embodiments thereof, many modifications and variations of such embodiments may be made by one skilled in the art without departing from the inventive concepts disclosed. For example, the foregoing taking and composing procedures could be used to produce an animated picture by taking sequential two-dimensional views of a changing object field or to produce a changing picture by taking each two-dimensional view (or pair of views) with different objects in the object field or even of different object fields in their entirety. Likewise, the two-dimensional views need not be taken directy from the object field itself, but may instead be made from a transmitted image of the object field, such as is produced, for example, by the image intensifier screen of an x-ray unit or an electron microscope. Accordingly, all such modifications and variations are intended to be included within the spirit and scope of the appended claims.

We claim:

1. In an image array formed on the photosensitive surface of lenticular print film of lenticule width $w$, said image array consisting of a multiplicity of image bands each of which is aligned with a lenticule of the film and each of which comprises N condensed images formed by projecting through a projecting lens and onto the aligned lenticule a portion of each of a corresponding N two-dimensional views of an object field taken from spaced vantage points, the improvement wherein:

each condensed image is formed by continuously changing the angle of projection of said portion of the corresponding two-dimensional view, while maintaining the projected image of a selected element of the two-dimensional view in registry with a reference point and while maintaining the ratio of (1) the distance between said selected element of the two-dimensional view and its projecting lens and (2) the distance between such projecting lens and the lenticular print film substantially constant, by an amount sufficient to scan the image of said portion over a distance along the photosensitive surface such that said each condensed image occupies a width of substantially $w/N$, whereby said scanning results in said each condensed image being greater in width than the width $m$ of an individual lineiform image formed by the aligned lenticule of said portion of the corresponding two-dimensional view, said each condensed image being substantially in focus and of substantially uniform image density across the fully width $w/N$ thereof.

* * * * *

UNITED STATES PATENT OFFICE
CERTIFICATE OF CORRECTION

Patent No. 4,120,562         Dated October 17, 1978

Inventor(s) Allen Kwok Wah Lo and Jerry Curtis Nims

It is certified that error appears in the above-identified patent and that said Letters Patent are hereby corrected as shown below:

Col. 5, line 62, "$\Delta X_{KA}$, and $\Delta X_{BK}$," should read --$\Delta X_{KA}$, and $\Delta X_{BK}$.--;

Col. 5, line 68, "$\Delta X_S$," should read --$\Delta X_S$,--;

Col. 6, line 4, "$\Delta X_S$, $\Delta K_{KA}$, and $\Delta X_{BK}$," should read --$\Delta X_S$, $\Delta X_{KA}$, and $\Delta X_{BK}$.--;

Col. 6, line 5, "$\Delta X_{KA}$, and $\Delta X_{BK}$," should read --$\Delta X_{KA}$, and $\Delta X_{BK}$.--;

Col. 7, line 46, "corresponing" should read --corresponding--;

Col. 10, line 40, "(x/N-1) - m" should read -- $\frac{x}{N-1} - m$ --.

Col. 14, last line, "fully width" should read --full width--.

Signed and Sealed this

Twenty-fourth Day of July 1979

[SEAL]

Attest:

LUTRELLE F. PARKER
*Attesting Officer*    *Acting Commissioner of Patents and Trademarks*